June 13, 1933. S. B. SMITH 1,913,732
SEALING MEANS FOR ENGINES
Filed July 17, 1930
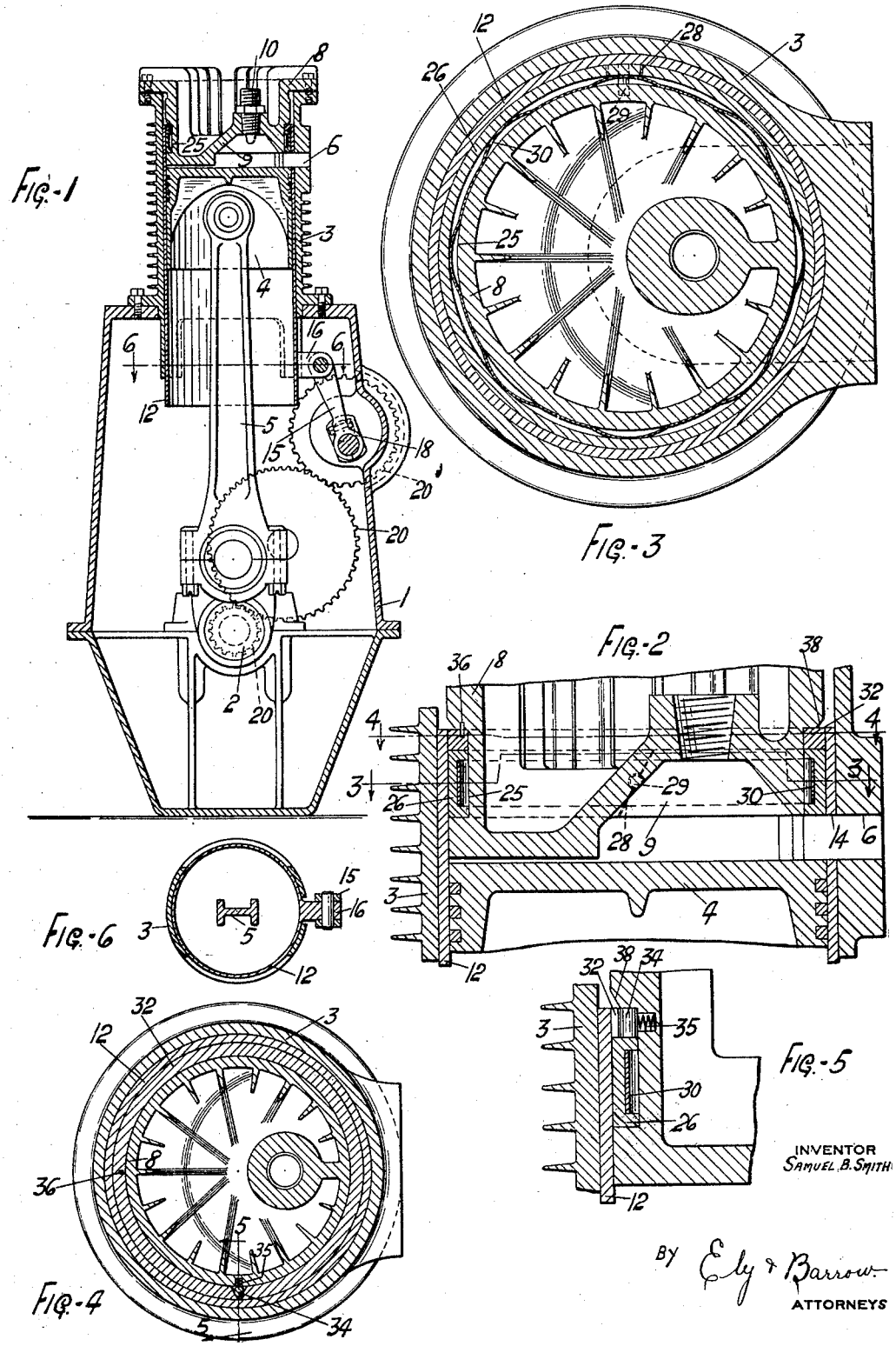

Patented June 13, 1933

1,913,732

UNITED STATES PATENT OFFICE

SAMUEL B. SMITH, OF ROCKY RIVER, OHIO

SEALING MEANS FOR ENGINES

Application filed July 17, 1930. Serial No. 468,611.

The present invention relates to engines of the sleeve or sliding valve type, and is particularly adapted and intended for use with engines operating upon the principle of compression ignition, although the invention is not restricted to this type of engine. It is the purpose of the invention to improve upon and perfect the sealing means employed in engines or compressors of any type, whereby a better and more effective seal is secured. In fact, the invention may be useful wherever sealing rings may be employed.

The invention consists primarily in the design and construction of sealing rings interposed between the body of the motor and a sliding or sleeve valve, whereby the movement of the valve and the pressure within the cylinder will serve to press the sealing rings into close fitting relationship to the valve member. It is also an object of the invention to so design the rings that the compression within the cylinder will cause the sealing means to be forced into close contact with the head of the engine.

It will be appreciated that while the sealing rings are illustrated and described in the head of the engine for sealing the passages above the combustion chamber, this same construction may be employed in the place of the usual piston rings on the piston.

In the drawing the best known or preferred form of the invention has been shown, but it will be appreciated that changes and modifications may be made in specific embodiments of the invention and without departing from the invention or sacrificing any of its benefits.

In the drawing:

Figure 1 is a vertical cross section of a single cylinder of a motor equipped with the improved sealing means located in the head of the engine;

Figure 2 is an enlarged cross section of the upper portion of the cylinder showing the sealing means employed;

Figure 3 is a section on the line 3—3 of Figure 2;

Figure 4 is a section on the line 4—4 of Figure 2;

Figure 5 is a section on the line 5—5 of Figure 4; and

Figure 6 is a section on the line 6—6 of Figure 1.

The invention will be described particularly as embodied in an engine of the compression ignition type, although as stated above it is not necessarily confined to motors, or to motors of that type.

In Figure 1 of the drawing the numeral 1 indicates the crank-case of the motor, 2 the crank-shaft and 3 the cylinder, it being understood that a plurality of cylinders may be employed in a complete engine. The piston is indicated at 4, and the connecting rod at 5. In the wall of the cylinder is located a single port 6, which, in the form of invention illustrated, is both an inlet and exhaust port. Surmounting the cylinder is the head 8 in which is formed the combustion chamber 9 in which is mounted the fuel inlet or injector 10. The wall of the chamber 9 opposite the port 6 is inclined as shown for the purpose of directing the gases toward the piston, and for assisting in the removal of the products of combustion.

Between the piston and the cylinder wall is located the sliding valve 12, which is provided with a port 14 adapted to be brought into register with the port 7 at the proper times by means of a link 15 pivoted to a lug 16 on the lower skirt of the valve, and to a crank 18 driven by the intermitting gearing 20 from the crank shaft. The engine is a four-stroke cycle engine, and the gearing is such that the valve is reciprocated at one-half the speed of reciprocation of the piston, in the manner well known and understood in the art. At its upper end the sliding valve extends into the space between the head and the upper end of the cylinder, it being observed that at its lowermost point the sleeve or sliding valve encloses the uppermost sealing ring to be described. At its lower end the cylinder is cut away in sections as shown in Figures 1 and 6 to expose the skirt of the valve.

The lower surface of the head 8 at one side thereof is cut away to expose the port 6 while the balance of the head extends below the port. In the head is located the relatively deep groove or seat 25, the lower surface of which is in alignment with the upper side of the port 6, and in this groove are seated the sealing rings.

Two sealing rings are provided, both of which are expansible, split, spring rings. The main or lower ring is indicated at 26, and has a relatively broad face which bears against the inner surface of the sliding valve. It is split as shown at 28 upon an inclined diagonal plane, and in the split is located the pin 29, which is fixed in the head and prevents the ring from rotating, and also tends to obstruct the passage of any gas through the split. The ring may be channeled upon its inner face, and in the channel may be located the undulating flat spring 30 which reacts against the head to force the ring outwardly into tight sealing relation with the sliding valve. This spring in the channel may be omitted, depending upon the use to which the invention is applied.

Above the ring 26 is the second ring 32, the two rings fitting as tightly as practical within the ring seat. This ring is split as shown in Figure 4, being provided with beveled ends which form a V-shaped recess for the reception of an expander, which may take the form of a roller 34, although any form of block may be used instead of the roller. The expander is pressed outwardly to expand the ring and seal the gap therein, by means of a coil spring 35 seated in the head. A pin 36 serves to prevent the ring 32 from rotating.

It will be observed that the inner face of the sliding valve is effectually sealed by the outward expansion of the two sealing rings, and that the upward movement of the sliding valve, which occurs during the upward movement of the piston or its compression stroke, tends to force both of the rings upwardly, the ring 26 against the under side of the ring 32, and the ring 32 against the upper wall of the ring seat. The lifting of the rings upwardly as described is also aided by any compression which may enter beneath the lower ring.

Attention is directed to the fact that the upper wall of the groove, which constitutes an abutment for the rings, is cut away as shown at 38, so that approximately only half of the upper surface of the ring 32 bears against the head. This serves to hold the ring 32 more firmly against the upper wall of the groove, as any pressure which might penetrate to the top wall of the groove, and thus tend to counter-balance the pressure upon the under surface of the ring 26, will be relieved. The fact that the lower surface of the ring 26 is exposed a considerable portion of its circumference will cause the ring to be forced upwardly into close contact with the ring 32. The opposing surfaces of the ring and groove are machine fitted as accurately as may be practicable to minimize any loss of pressure.

The invention is shown in its simplest form for the sake of making the same clear, it being appreciated that refinements and improvements may be made thereon within the scope of the invention.

What is claimed is:

1. In an engine the combination of a cylinder having a port therein, a head fitting within the cylinder and having a groove therein, the lower wall of which is in alignment with the upper wall of the port, a lower sealing ring seated in the groove and having the entire width of the bottom edge portion of a substantial part of the ring exposed, an upper sealing ring resting upon the lower ring and therewith filling the groove, and a sliding valve movable within the cylinder.

2. In an engine the combination of a cylinder having a port therein, a head fitting within the cylinder and having a groove therein, the lower wall of which is in alignment with the upper wall of the port, a lower sealing ring seated in the groove and having the entire width of the bottom edge portion of a substantial part of the ring exposed, an upper sealing ring resting upon the lower ring and therewith filling the groove, a sliding valve movable within the cylinder, both of said rings being split, and spring means to force them outwardly against the valve.

3. In an engine the combination of a cylinder having a port therein, a head fitting within the cylinder and having a groove therein, the lower wall of which is in alignment with the upper wall of the port, a lower sealing ring seated in the groove and exposed over a portion of its lower surface, an upper sealing ring resting upon the lower ring and therewith filling the groove, and a sliding valve movable within the cylinder, the upper wall of the groove being cut away to reduce the area of contact with the upper ring.

4. In an engine the combination of a cylinder having a port therein, a head fitting within the cylinder and having a groove therein, the lower wall of which is in alignment with the upper wall of the port, a lower sealing ring seated in the groove and exposed over a portion of its lower surface, an upper sealing ring resting upon the lower ring and therewith filling the groove, a sliding valve movable within the cylinder, both of said rings being split, and spring means to force them outwardly against the valve, the upper wall of the groove being cut away to reduce the area of contact with the upper ring.

5. In an engine the combination of a cylinder having a port therein, a head fitting within the cylinder and having a groove therein, the lower wall of which is in alignment with the upper wall of the port, a lower sealing ring seated in the groove and having the entire width of the bottom edge portion of a substantial part of the ring exposed, an upper sealing ring resting upon the lower ring and therewith filling the groove, a sliding valve movable within the cylinder, a piston, and means to move the valve upwardly during the compression stroke of the piston.

6. In an engine the combination of a cylinder having a port therein, a head fitting within the cylinder and having a groove therein, the lower wall of which is in alignment with the upper wall of the port, a lower sealing ring seated in the groove and having the entire width of the bottom edge portion of a substantial part of the ring exposed, an upper sealing ring resting upon the lower ring and therewith filling the groove, a sliding valve movable within the cylinder, both of said rings being split, spring means to force them outwardly against the valve, a piston, and means to move the valve upwardly during the compression stroke of the piston.

7. In an engine the combination of a cylinder having a port therein, a head fitting within the cylinder and having a groove therein, the lower wall of which is in alignment with the upper wall of the port, a lower sealing ring seated in the groove and exposed over a portion of its lower surface, an upper sealing ring resting upon the lower ring and therewith filling the groove, a sliding valve movable within the cylinder, the upper wall of the groove being cut away to reduce the area of contact with the upper ring, a piston, and means to move the valve upwardly during the compression stroke of the piston.

8. In an engine the combination of a cylinder having a port therein, a head fitting within the cylinder and having a groove therein, the lower wall of which is in alignment with the upper wall of the port, a lower sealing ring seated in the groove and exposed over a portion of its lower surface, an upper sealing ring resting upon the lower ring and therewith filling the groove, a sliding valve movable within the cylinder, both of said rings being split, spring means to force them outwardly against the valve, the upper wall of the groove being cut away to reduce the area of contact with the upper ring, a piston, and means to move the valve upwardly during the compression stroke of the piston.

9. An engine comprising a cylinder having a port, a head in the upper end of the cylinder, a sliding valve within the cylinder extending above the port, and sealing means between the valve and the head comprising a split, expansible sealing ring having a portion of its lower surface exposed to the compression within the cylinder, a second split, expansible sealing ring superposed thereon, and an abutment on the head for the second sealing ring, said abutment being of less area than the lower surfaces of either of said rings.

10. An engine comprising a cylinder having a port, a head in the upper end of the cylinder, a sliding valve within the cylinder extending above the port, and sealing means between the valve and the head comprising a split, expansible sealing ring, having a portion of its lower surface exposed to the compression within the cylinder, a second split, expansible sealing ring superposed thereon, an abutment on the head for the second sealing ring, said abutment being of less area than the lower surfaces of either of said rings, and spring means tending to expand said sealing rings.

11. An engine comprising a cylinder having a port, a head in the upper end of the cylinder, a sliding valve within the cylinder extending above the port, and sealing means between the valve and the head comprising a split, expansible sealing ring, a second split, expansible sealing ring superposed thereon, and an abutment on the head for the second sealing ring, said abutment being of less area than the lower surfaces of either of said rings.

12. An engine comprising a cylinder having a port, a head in the upper end of the cylinder, a sliding valve within the cylinder extending above the port, and sealing means between the valve and the head comprising a split, expansible sealing ring, a second split, expansible sealing ring superposed thereon, an abutment on the head for the second sealing ring, said abutment being of less area than the lower surfaces of either of said rings, and spring means tending to expand said sealing rings.

13. In an engine the combination of a cylinder having a port therein, a head fitting within the cylinder and having a groove therein, the lower wall of which is in alignment with the upper wall of the port, a lower sealing ring seated in the groove and exposed over a portion of its lower surface, and an upper sealing ring resting upon the lower ring and therewith filling the groove, the upper wall of the groove being cut away to reduce the area of contact with the upper ring.

14. In an engine the combination of a cylinder having a port therein, a head fitting within the cylinder and having a groove therein, the lower wall of which is in alignment with the upper wall of the port, a lower sealing ring seated in the groove and exposed over a portion of its lower surface, an upper sealing ring resting upon the lower ring and therewith filling the groove, both of said rings being split, and spring means to force them outwardly, the upper wall of the groove being cut away to reduce the area of contact with the upper ring.

SAMUEL B. SMITH.